US012683110B2

(12) United States Patent
Suzuki et al.

(10) Patent No.: US 12,683,110 B2
(45) Date of Patent: Jul. 14, 2026

(54) X-RAY GENERATION DEVICE

(71) Applicant: HAMAMATSU PHOTONICS K.K., Hamamatsu (JP)

(72) Inventors: Naonobu Suzuki, Hamamatsu (JP); Atsushi Ishii, Hamamatsu (JP); Ryosuke Yabushita, Hamamatsu (JP); Akimichi Shimizu, Hamamatsu (JP); Naofumi Kosugi, Hamamatsu (JP); Ginji Sugiura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 211 days.

(21) Appl. No.: 18/571,485

(22) PCT Filed: Mar. 9, 2022

(86) PCT No.: PCT/JP2022/010346
§ 371 (c)(1),
(2) Date: Dec. 18, 2023

(87) PCT Pub. No.: WO2022/270032
PCT Pub. Date: Dec. 29, 2022

(65) Prior Publication Data

US 2024/0282545 A1 Aug. 22, 2024

(30) Foreign Application Priority Data

Jun. 24, 2021 (JP) ................................. 2021-104653

(51) Int. Cl.
*H01J 35/18* (2006.01)
*H01J 35/14* (2006.01)
*H01J 35/30* (2006.01)

(52) U.S. Cl.
CPC ............ *H01J 35/18* (2013.01); *H01J 35/153* (2019.05); *H01J 35/30* (2013.01)

(58) Field of Classification Search
CPC .. H01J 35/14; H01J 35/18; H01J 35/30; H01J 35/08; H01J 35/116; H01J 35/153; H01J 35/16
See application file for complete search history.

(56) References Cited

U.S. PATENT DOCUMENTS

2005/0141669 A1* 6/2005 Shimono .............. H01J 35/153
378/137
2010/0141151 A1 6/2010 Reinhold
2015/0380201 A1 12/2015 Yoshizawa

FOREIGN PATENT DOCUMENTS

CN 1698175 A 11/2005
CN 101266218 A 9/2008
(Continued)

OTHER PUBLICATIONS

International Preliminary Report on Patentability mailed Jan. 4, 2024 for PCT/JP2022/010346.

*Primary Examiner* — Jurie Yun
(74) *Attorney, Agent, or Firm* — Faegre Drinker Biddle & Reath LLP

(57) ABSTRACT

An X-ray generation device includes an X-ray tube, and an electron beam adjustment part. The X-ray tube includes a housing, an electron gun, a target, and a window member. When a first defect exists in the target, the electron beam adjustment part adjusts an electron beam such that the first defect is not included in an irradiation region of the electron beam on the target, and when a second defect exists in the window member, the electron beam adjustment part adjusts the electron beam such that the second defect is not included in a projection region of the electron beam on the window member.

8 Claims, 5 Drawing Sheets

(56) References Cited

FOREIGN PATENT DOCUMENTS

| | | | |
|---|---|---|---|
| CN | 104701118 | A | 6/2015 |
| CN | 106474632 | A | 3/2017 |
| CN | 111564351 | A | 8/2020 |
| JP | 09-283408 | A | 10/1997 |
| JP | 2003-090808 | A | 3/2003 |
| JP | 2004-265602 | A | 9/2004 |
| JP | 2007-207548 | A | 8/2007 |
| JP | 2013-160637 | A | 8/2013 |
| JP | 5911323 | B2 | 4/2016 |
| JP | 6381269 | B2 | 8/2018 |
| JP | 6452334 | B2 | 1/2019 |
| TW | 200421497 | A | 10/2004 |

* cited by examiner

X-RAY GENERATION DEVICE

TECHNICAL FIELD

The present disclosure relates to an X-ray generation device.

BACKGROUND ART

An X-ray tube including a housing; an electron gun that emits an electron beam inside the housing; a target that generates an X-ray upon the incidence of the electron beam inside the housing; and a window member that seals an opening of the housing and that transmits the X-ray is known. In such an X-ray tube, the window member may be formed in a plate shape from a single crystal diamond, and the target may be formed on an inner surface of the window member (for example, refer to Patent Literature 1).

CITATION LIST

Patent Literature

Patent Literature 1: Japanese Patent No. 5911323

SUMMARY OF INVENTION

Technical Problem

In an X-ray generation device including the X-ray tube described above, various defects may exist in at least one of the target and the window member. In such a case, for example, when a defect existing in the target is irradiated with the electron beam, the irradiation leads to a variation in the focal diameter of the X-ray generated on the target, a variation in the output X-ray dose, or the like, which is a risk. On the other hand, it is very difficult to prepare the target and the window member in which no defect exists.

An object of the present disclosure is to provide an X-ray generation device capable of obtaining a stable output of an X-ray even when a defect exists in at least one of a target and a window member.

Solution to Problem

According to one aspect of the present disclosure, an X-ray generation device includes an X-ray tube, and an electron beam adjustment part. The X-ray tube includes a housing, an electron gun that emits an electron beam inside the housing, a target that generates an X-ray upon an incidence of the electron beam inside the housing, and a window member that seals an opening of the housing and that transmits the X-ray. A defect exists in at least one of the target and the window member. When a first defect exists in the target as the defect, the electron beam adjustment part adjusts the electron beam such that the first defect is not included in an irradiation region of the electron beam on the target, and when a second defect exists in the window member as the defect, the electron beam adjustment part adjusts the electron beam such that the second defect is not included in a projection region of the electron beam on the window member.

In the X-ray generation device, the electron beam adjustment part adjusts the electron beam such that the first defect existing in the target is not included in the irradiation region of the electron beam on the target and/or such that the second defect existing in the window member is not included in the projection region of the electron beam on the window member. Therefore, according to the X-ray generation device, a stable output of the X-ray can be obtained even when a defect exists in at least one of the target and the window member.

Incidentally, in the case of assuming that the electron beam incident on the target transmits through the target, when the window member is disposed at a position where the electron beam that has transmitted through the target is incident, the projection region of the electron beam on the window member means an irradiation region of the electron beam assumed to transmit through the target and be incident on the window member. In addition, in the case of assuming that the electron beam incident on the target is reflected by the target, when the window member is disposed at a position where the electron beam reflected by the target is incident, the projection region of the electron beam on the window member means an irradiation region of the electron beam assumed to be reflected by the target and be incident on the window member.

In the X-ray generation device according to one aspect of the present disclosure, the electron beam adjustment part may include a deflection part that adjusts a trajectory of the electron beam. Accordingly, the incident position of the electron beam on the target can be adjusted such that the first defect existing in the target is not included in the irradiation region of the electron beam on the target and/or such that the second defect existing in the window member is not included in the projection region of the electron beam on the window member.

In the X-ray generation device according to one aspect of the present disclosure, the deflection part may be an electromagnetic coil. Accordingly, the trajectory of the electron beam can be accurately adjusted.

In the X-ray generation device according to one aspect of the present disclosure, the deflection part may be a permanent magnet. Accordingly, the trajectory of the electron beam can be adjusted with a simple configuration.

In the X-ray generation device according to one aspect of the present disclosure, the electron beam adjustment part may adjust the irradiation region of the electron beam on the target. Accordingly, the irradiation region of the electron beam on the target can be adjusted such that the first defect existing in the target is not included in the irradiation region of the electron beam on the target and/or such that the second defect existing in the window member is not included in the projection region of the electron beam on the window member.

In the X-ray generation device according to one aspect of the present disclosure, the window member may be formed in a plate shape from a single crystal diamond, polycrystalline diamond, or mosaic crystal diamond. Accordingly, the window member that is excellent in X-ray transmission properties, heat resistance, heat dissipation, and the like can be obtained. On the other hand, a crystal defect or the like is likely to occur in the window member; however, as described above, since the electron beam is adjusted by the electron beam adjustment part, a stable output of the X-ray can be obtained.

In the X-ray generation device according to one aspect of the present disclosure, the window member may have a surface on an interior side of the housing, and the target may be formed on the surface. Accordingly, a stable output of the X-ray can be obtained using the transmission type X-ray tube. Further, in a case where a defect such as unevenness exists in the target formed on the surface of the window member, when the defect such as unevenness is irradiated with the electron beam, damage such as the target peeling off from the window member is likely to occur in the target; however, since the electron beam is adjusted by the electron beam adjustment part, such damage to the target can be prevented.

Advantageous Effects of Invention

According to the present disclosure, it is possible to provide the X-ray generation device capable of obtaining a stable output of the X-ray even when a defect exists in at least one of the target and the window member.

DESCRIPTION OF EMBODIMENTS

Figure 1:
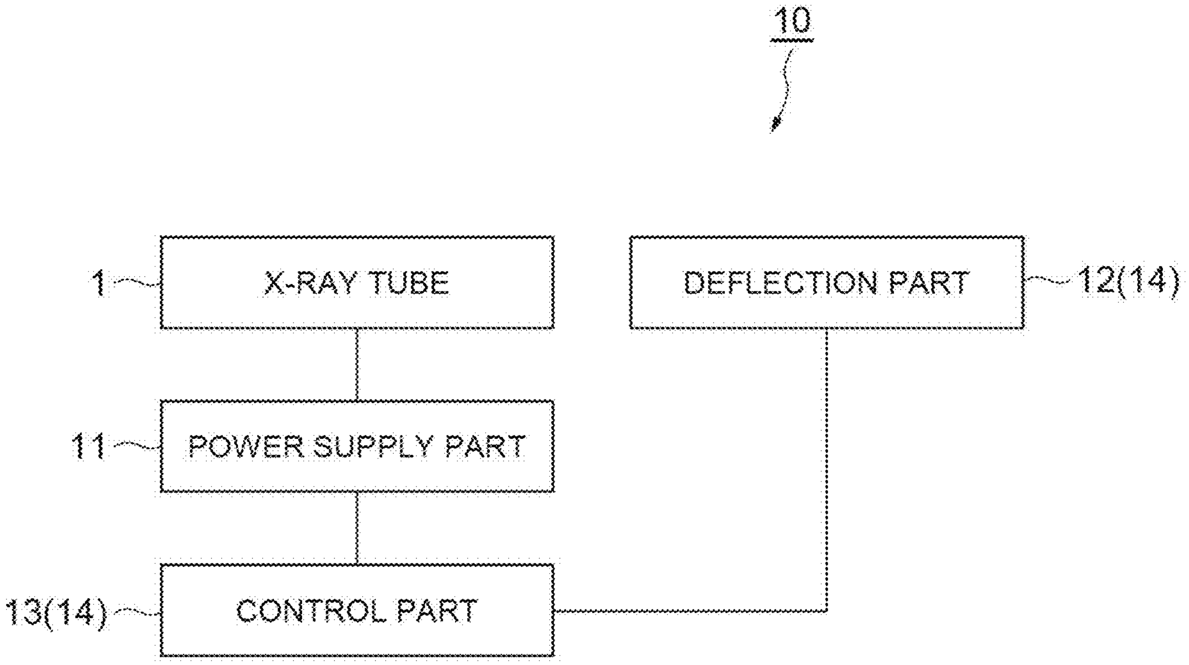
FIG. 1 is a block diagram of an X-ray generation device of one embodiment.

Hereinafter, an embodiment of the present disclosure will be described in detail with reference to the drawings. Incidentally, in the drawings, the same or corresponding portions are denoted by the same reference signs, and duplicate descriptions will be omitted.

[Configuration of X-Ray Generation Device]

As shown in FIG. 1, an X-ray generation device 10 includes an X-ray tube 1, a power supply part 11, a deflection part 12, and a control part 13. The X-ray tube 1, the power supply part 11, and the deflection part 12 are supported inside a casing (not shown) made of metal. The deflection part 12 and the control part 13 function as an electron beam adjustment part 14 (details will be described later). As one example, the X-ray tube 1 is a small-focus X-ray source, and the X-ray generation device 10 is a device used for X-ray non-destructive inspection for magnifying and observing an internal structure of an inspection object.

Figure 2:
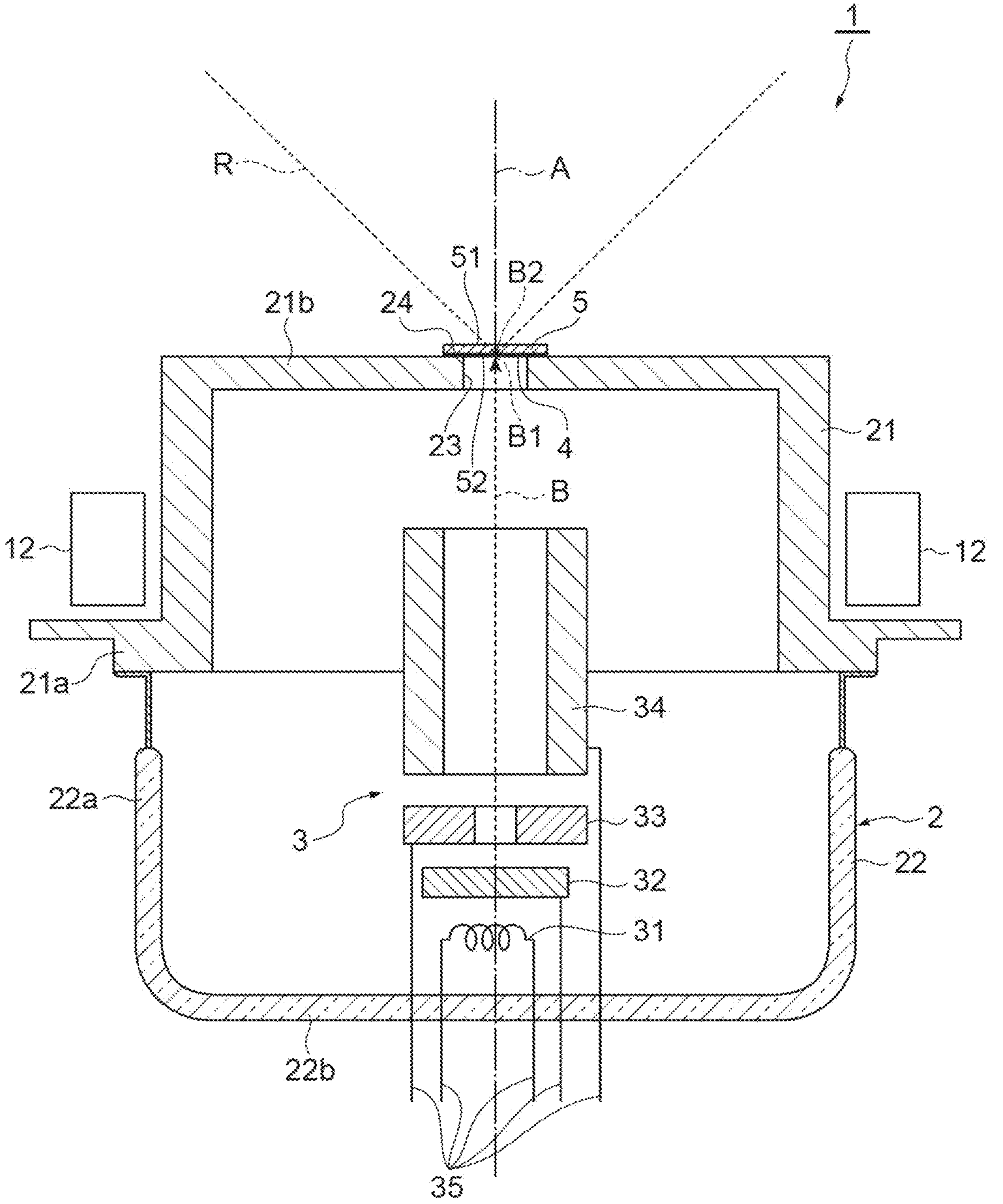
FIG. 2 is a cross-sectional view of an X-ray tube shown in FIG. 1.

As shown in FIG. 2, the X-ray tube 1 includes a housing 2, an electron gun 3, a target 4, and a window member 5. As described below, the X-ray tube 1 is configured as a sealed transmission type X-ray tube that does not require replacement of components and the like.

The housing 2 includes a head 21 and a valve 22. The head 21 is formed in a bottomed tubular shape from metal. The valve 22 is formed in a bottomed tubular shape from an insulating material such as glass. An opening portion 22*a* of the valve 22 is airtightly joined to an opening portion 21*a* of the head 21. In the X-ray tube 1, a center line of the housing 2 is a tube axis A. An opening 23 is formed in a bottom wall portion 21*b* of the head 21. The opening 23 is located on the tube axis A. The opening 23 has, for example, a circular shape with the tube axis A as the center line when viewed in a direction parallel to the tube axis A.

The electron gun 3 emits an electron beam B inside the housing 2. The electron gun 3 includes a heater 31, a cathode 32, a first grid electrode 33, and a second grid electrode 34. The heater 31, the cathode 32, the first grid electrode 33, and the second grid electrode 34 are disposed on the tube axis A in this order from a bottom wall portion 22*b* side of the valve 22. The heater 31 is composed of a filament, and generates heat when energized. The cathode 32 is heated by the heater 31 to release electrons. The first grid electrode 33 is formed in a tubular shape, and adjusts the amount of the electrons released from the cathode 32. The second grid electrode 34 is formed in a tubular shape, and focuses the electrons, which have passed through the first grid electrode 33, onto the target 4. The heater 31, the cathode 32, the first grid electrode 33, and the second grid electrode 34 are electrically and physically connected to a plurality of respective lead pins 35 penetrating through a bottom wall portion 22*b* of the valve 22. Incidentally, the focus state of the electron beam B on the target 4 can be adjusted not only by the second grid electrode 34 but also by the first grid electrode 33.

The window member 5 seals the opening 23 of the housing 2. The window member 5 is formed in a plate shape from a single crystal diamond, polycrystalline diamond, or mosaic crystal diamond (diamond in which a plurality of crystal members are adjacently joined in a lateral direction). The window member 5 has, for example, a disk shape with the tube axis A as the center line. The window member 5 has a first surface 51 and a second surface (surface) 52. The first surface 51 is a surface opposite to the interior of the housing 2, and the second surface 52 is a surface on an interior side of the housing 2. Each of the first surface 51 and the second surface 52 is, for example, a flat surface perpendicular to the tube axis A. The target 4 is formed on the second surface 52 of the window member 5. The target 4 is, for example, formed in a film shape from tungsten. The target 4 generates an X-ray R upon the incidence of the electron beam B inside the housing 2. In the present embodiment, the X-ray R generated in the target 4 transmits through the target 4 and the window member 5, and is emitted to the outside.

The window member 5 is attached to an attachment surface 24 around the opening 23 of the housing 2. The attachment surface 24 is, for example, a flat surface perpendicular to the tube axis A, and is formed on the head 21. The window member 5 is airtightly joined to the attachment surface 24 via a joining member (not shown) such as a brazing material. In the X-ray tube 1, the target 4 is electrically connected to the head 21, and the target 4 and the window member 5 are thermally connected to the head 21. As one example, the target 4 is set to the ground potential via the head 21. As one example, heat generated in the target 4 upon the incidence of the electron beam B is transferred to the head 21 directly and/or via the window member 5, and is released from the head 21 to a heat dissipation part (not shown). In the present embodiment, an inner space of the housing 2 is maintained at a high degree of vacuum by the housing 2, the target 4, and the window member 5.

In the X-ray generation device 10 configured as described above, a negative voltage is applied to the electron gun 3 by the power supply part 11 with the potential of the target 4 as a reference. As one example, the power supply part 11 applies a negative high voltage (for example, −10 kV to −500 kV) to each part of the electron gun 3 via each of the lead pins 35 in a state where the target 4 is set to the ground potential. The electron beam B emitted from the electron gun 3 is focused onto the target 4 along the tube axis A. The X-ray R generated in an irradiation region B1 of the electron beam B on the target 4 transmits through the target 4 and the window member 5 and is emitted to the outside with the irradiation region B1 as the focal point.

[Function of Deflection Part and Control Part as Electron Beam Adjustment Part]

Prior to describing the function of the deflection part 12 and the control part 13 as the electron beam adjustment part 14, defects existing in at least one of the target 4 and the window member 5 will be described. In the following description, a defect existing in the target 4 is referred to as a "first defect", and a defect existing in the window member 5 is referred to as a "second defect".

Figure 3:
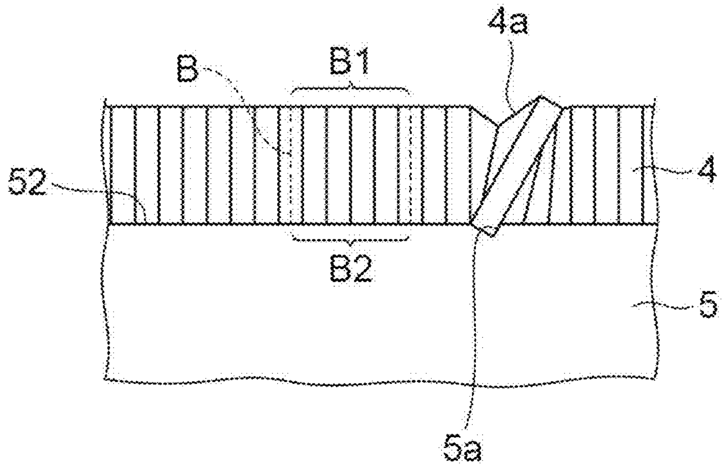
FIG. 3 is a side view of a portion of a window member shown in FIG. 2.

As shown in FIG. 3, a second defect 5*a* exists in the window member 5 formed in a plate shape from a single crystal diamond, polycrystalline diamond, or mosaic crystal diamond. A plurality of the second defects 5*a* may exist in the window member 5, and the position of each of the second defects 5*a* in the window member 5 is random. Examples of the second defect 5*a* existing in the window member 5 include a polycrystalline region (a combination of a lattice defect existing inside a substrate and a surface defect occurring on a surface of the substrate) occurring at a joint portion when mosaic crystal diamond is formed by joining a plurality of single crystal members, and the like in addition to "a lattice defect occurring inside a single crystal diamond substrate due to non-uniformity during crystal growth of the substrate" (hereinafter, simply referred to as a "lattice defect"), "a surface defect occurring on a surface of a single crystal diamond substrate due to non-uniformity during crystal growth of the substrate" (hereinafter, simply referred to as a "surface defect"), and "a particle defect occurring on a surface of a polycrystalline diamond substrate during polishing of the substrate" (hereinafter, simply referred to as a "particle defect").

A first defect 4*a* exists in the target 4 formed on the second surface 52 of the window member 5. A plurality of the first defects 4*a* may exist in the target 4, and the position of each of the first defects 4*a* in the target 4 is random. Examples of the first defect 4*a* existing in the target 4 include "a depression occurring during sputtering of a target material on the second surface 52 of the window member 5 in which a surface defect or particle defect occurs" (hereinafter, simply referred to as a "depression").

In a case where "a lattice defect exists in the window member 5", when the X-ray R generated by the target 4 transmits through a region corresponding to the defect in the window member 5, the X-ray R is affected by diffraction or the like to be changed in X-ray intensity compared to the X-ray R transmitting through a region in which no defect exits, which is a risk. Then, when an inspection object is irradiated with the X-ray R, streaky bright lines and/or dark lines appear in the obtained X-ray image, which is a risk. In a case where "a surface defect or particle defect exists on the window member 5" and/or in a case where "a depression exists on the target 4", when a region corresponding to the defect on the target 4 is irradiated with the electron beam B, the target 4 peels off from the window member 5 with the defect as an initiation point, damage occurs in the target 4 due to abnormal heat generation, the focal diameter of the X-ray R generated on the target 4 varies, or the output X-ray dose varies, which is a risk.

Incidentally, the reason that the target 4 peels off from the window member 5 with the defect as an initiation point is that a stress of approximately 2 GPa is generated on adhesive surfaces of the target 4 and the window member 5 due to a difference in the coefficient of linear expansion between the window member 5 and the target 4 formed by sputtering. The reason that abnormal heat generation occurs is that the adhesion between the window member 5 and the target 4 is not sufficient and heat transfer from the target 4 to the window member 5 is reduced. The reason that the focal diameter of the X-ray R generated on the target 4 varies or the output X-ray dose varies is that the adhesion between the window member 5 and the target 4 is not sufficient.

In the X-ray generation device 10 including the target 4 and the window member 5 described above, the deflection part 12 and the control part 13 function as the electron beam adjustment part 14. Namely, when the first defect 4*a* exists in the target 4, the deflection part 12 and the control part 13 adjust the electron beam B such that the first defect 4*a* is not included in the irradiation region B1 of the electron beam B on the target 4, and when the second defect 5*a* exists in the window member 5, the deflection part 12 and the control part 13 adjust the electron beam B such that the second defect 5*a* is not included in a projection region B2 of the electron beam B on the window member 5. Incidentally, in the present embodiment, a defect having an area equal to or more than 1/100 of the spot area of the electron beam B on the target 4 when viewed in a thickness direction of the window member 5 is targeted for the adjustment of the electron beam B.

As shown in FIGS. 2 and 3, in the case of assuming that the electron beam B incident on the target 4 transmits through the target 4, when the window member 5 is disposed at a position where the electron beam B that has transmitted through the target 4 is incident, the projection region B2 of the electron beam B on the window member 5 means an irradiation region of the electron beam B assumed to transmit through the target 4 and be incident on the window member 5.

Adjusting the electron beam B such that the first defect 4*a* is not included in the irradiation region B1 of the electron beam B on the target 4 means that the electron beam B is adjusted such that the first defect 4*a* is not included in the irradiation region B1 when viewed in the direction of incidence of the electron beam B on the target 4. Adjusting the electron beam B such that the second defect 5*a* is not included in the projection region B2 of the electron beam B on the window member 5 means that the electron beam B is adjusted such that the second defect 5*a* is not included in the projection region B2 when viewed in the direction of incidence of the electron beam B on the window member 5.

As one example, in a case where "a lattice defect exists in the window member 5", when the electron beam B is adjusted such that the second defect 5*a* is not included in the projection region B2 of the electron beam B on the window member 5, the occurrence of an instance where the X-ray R that has transmitted through the lattice defect of the window member 5 is included in the X-ray R with which the inspection object is to be irradiated can be suppressed. Then, the larger the distance between the projection region B2 of the electron beam B on the window member 5 and the lattice defect of the window member 5 is, the farther an emission direction of the X-ray R that has transmitted through the lattice defect of the window member 5 is from a front direction (tube axis A) of the window member 5, so that the occurrence of an instance where the X-ray R that has transmitted through the lattice defect of the window member 5 is included in the X-ray R with which the inspection object is to be irradiated can be further suppressed.

Figure 4:
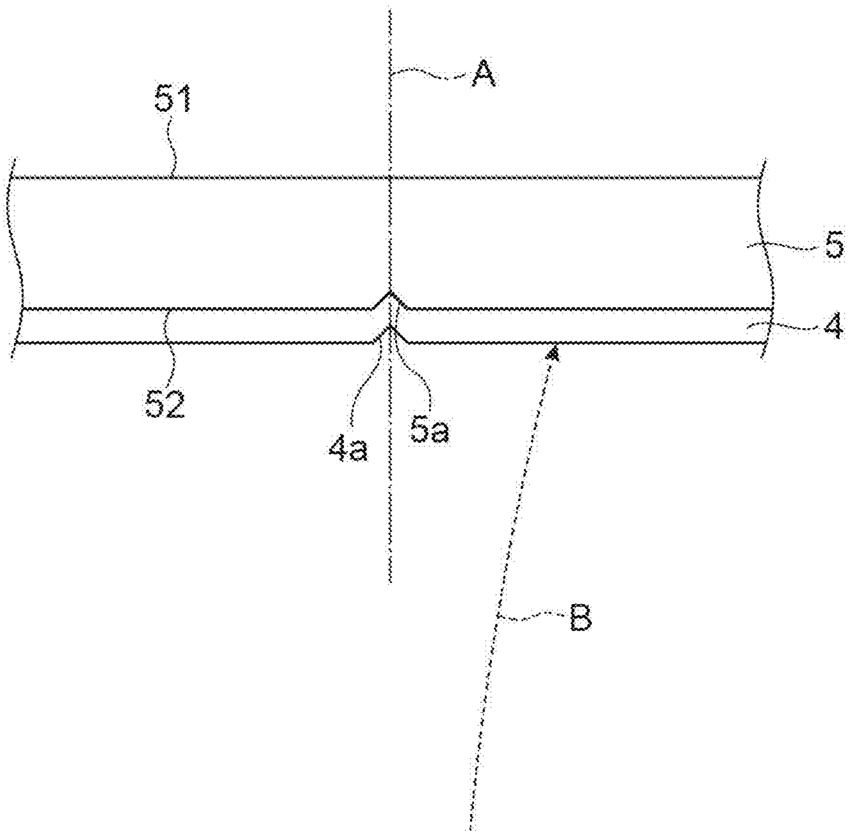
FIG. 4 is a side view showing a trajectory of an electron beam incident on a target shown in FIG. 2.

In the present embodiment, as shown in FIG. 2, the deflection part 12 is an electromagnetic coil disposed to surround the head 21 of the X-ray tube 1, and adjusts the trajectory of the electron beam B according to the strength of the generated magnetic field. At this time, the control part 13 controls a current flowing through the electromagnetic coil. For example, as shown in FIG. 4, when the first defect 4*a* and the second defect 5*a* are located on the tube axis A, the deflection part 12 adjusts the trajectory of the electron beam B such that the electron beam B is incident on the target 4 at a position away from the tube axis A.

The deflection part 12 and the control part 13 may function as the electron beam adjustment part 14 during actual operation of the X-ray generation device 10, or may function as the electron beam adjustment part 14 before actual operation of the X-ray generation device 10. Incidentally, "before actual operation of the X-ray generation device 10" includes the timing of shipment inspection of the X-ray generation device 10, the periodic timing before actual operation of the X-ray generation device 10, and the like.

An example in which the deflection part 12 and the control part 13 function as the electron beam adjustment part 14 during actual operation of the X-ray generation device 10 is as follows. The control part 13 receives "information on the output of the X-ray R" from an X-ray detection device during actual operation of the X-ray generation device 10, and controls the deflection part 12 based on the "information on the output of the X-ray R". Specifically, when an abnormality (for example, a non-uniformity of the X-ray intensity, a variation in the focal diameter of the X-ray R, a variation in X-ray dose, or the like) is confirmed in the output of the X-ray R, the control part 13 controls the deflection part 12 such that the abnormality in the output of the X-ray R is not confirmed. The reason is that the state where an abnormality is confirmed in the output of the X-ray R corresponds to "a state where the first defect 4*a* is irradiated with the electron beam B" and/or "a state where the second defect 5*a* is irradiated with the X-ray R", and the state where an abnormality is not confirmed in the output of the X-ray R corresponds to "a state where the first defect 4*a* is not irradiated with the electron beam B and the second defect 5*a* is not irradiated with the X-ray R".

An example in which the deflection part 12 and the control part 13 function as the electron beam adjustment part 14 before actual operation of the X-ray generation device 10 is as follows. The control part 13 receives "information on the output of the X-ray R" from the X-ray detection device while changing the incident position of the electron beam B on the target 4 by causing the X-ray generation device 10 to temporarily operate and by controlling the deflection part 12. Accordingly, the control part 13 stores the "information on the output of the X-ray R" in association with the incident position of the electron beam B on the target 4. Subsequently, the control part 13 controls the deflection part 12 such that the electron beam B is not incident on an incident position where an abnormality in the output of the X-ray R is confirmed and the electron beam B is incident on an incident position where an abnormality in the output of the X-ray R is not confirmed, based on the "information on the output of the X-ray R" stored in association with the incident position of the electron beam B on the target 4.

Incidentally, the X-ray detection device may be a device capable of detecting at least one of a non-uniformity of the X-ray intensity, a variation in the focal diameter of the X-ray R, and a variation in X-ray dose. In addition, when the X-ray detection device detects an abnormality in the output of the X-ray R, the control part 13 may control the deflection part 12 based on information input by an operator.

For reference, the X-ray generation device 10 may be manufactured as follows. First, when the window member 5 is obtained, it is inspected whether or not the second defect 5*a* exists in the window member 5. As one example, the presence or absence of a surface defect or particle defect is inspected by an optical microscope, and the presence or absence of a lattice defect is inspected by an X-ray diffractometer. Subsequently, when the second defect 5*a* exists in the window member 5, a marking is applied to the window member 5 such that the existence position of the second defect 5*a* can be specified. As one example, a laser marking is applied to a surface on an opposite side of the window member 5 from a side on which the target 4 is formed. Subsequently, the target 4 is formed on the window member 5.

Subsequently, with reference to the marking applied to the window member 5, the X-ray tube 1 is assembled such that a position on the target 4 corresponding to the second defect 5*a* is not irradiated with the electron beam B. Alternatively, with reference to the marking applied to the window member 5, the deflection amount of the electron beam B is determined such that the position on the target 4 corresponding to the second defect 5*a* is not irradiated with the electron beam B. Incidentally, when a plurality of the second defects 5*a* exist in the window member 5, it is preferable that the window member 5 is disposed such that at least one second defect 5*a* (preferably, the largest second defect 5*a* among the plurality of second defects 5*a*) is located in an outer edge region (preferably, a region outside the region on which the electron beam B can be incident by adjusting a deflection state and/or a focus state) of the window member 5.

Actions and Effects

In the X-ray generation device 10, the electron beam adjustment part 14 adjusts the electron beam B such that the first defect 4*a* existing in the target 4 is not included in the irradiation region B1 of the electron beam B on the target 4 and/or such that the second defect 5*a* existing in the window member 5 is not included in the projection region B2 of the electron beam B on the window member 5. Therefore, according to the X-ray generation device 10, a stable output of the X-ray R can be obtained even when a defect exists in at least one of the target 4 and the window member 5.

In the X-ray generation device 10, the electron beam adjustment part 14 includes the deflection part 12 that adjusts the trajectory of the electron beam B. Accordingly, the incident position of the electron beam B on the target 4 can be adjusted such that the first defect 4*a* existing in the target 4 is not included in the irradiation region B1 of the electron beam B on the target 4 and/or such that the second defect 5*a* existing in the window member 5 is not included in the projection region B2 of the electron beam B on the window member 5.

In the X-ray generation device 10, the deflection part 12 is an electromagnetic coil. Accordingly, the trajectory of the electron beam B can be accurately adjusted.

In the X-ray generation device 10, the window member 5 is formed in a plate shape from a single crystal diamond, polycrystalline diamond, or mosaic crystal diamond. Accordingly, the window member 5 that is excellent in X-ray transmission properties, heat resistance, heat dissipation, and the like can be obtained. On the other hand, a crystal defect (lattice defect, surface defect, particle defect, or the like) or the like is likely to occur in the window member 5; however, as described above, since the electron beam B is adjusted by the electron beam adjustment part 14, a stable output of the X-ray R can be obtained.

In the X-ray generation device 10, the target 4 is formed on the second surface 52 of the window member 5. Accordingly, a stable output of the X-ray R can be obtained using the transmission type X-ray tube. Further, in a case where a defect (depression or the like) such as unevenness exists in the target 4 formed on the second surface 52 of the window member 5, when the defect such as unevenness is irradiated with the electron beam B, damage such as the target 4 peeling off from the window member 5 is likely to occur in the target 4; however, as described above, since the electron beam B is adjusted by the electron beam adjustment part 14, such damage to the target 4 can be prevented.

Modification Example

Figure 5:
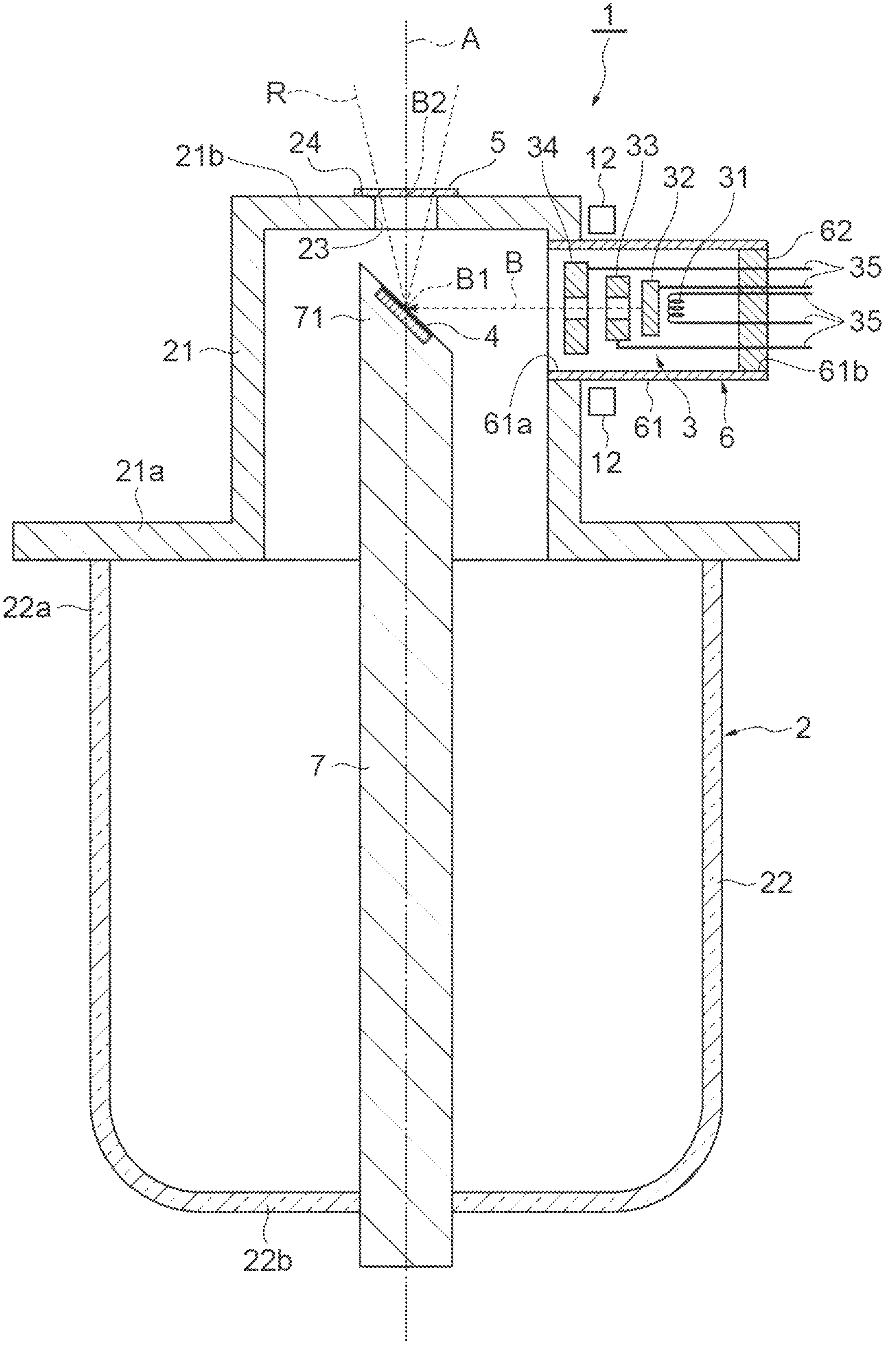
FIG. 5 is a cross-sectional view of an X-ray tube of a modification example.

The present disclosure is not limited to the embodiment. The X-ray tube 1 may be configured as a sealed reflection type X-ray tube. As shown in FIG. 5, the sealed reflection type X-ray tube 1 mainly differs from the sealed transmission type X-ray tube 1 in that the electron gun 3 is disposed inside an accommodation part 6 beside the head 21 and in that the target 4 is supported by a support member 7 instead of the window member 5. The accommodation part 6 includes a side tube 61 and a stem 62. The side tube 61 is joined to a side wall portion of the head 21 such that one opening portion 61*a* of the side tube 61 faces the interior of the head 21. The stem 62 seals the other opening 61*b* of the side tube 61. The heater 31, the cathode 32, the first grid electrode 33, and the second grid electrode 34 are disposed inside the side tube 61 in this order from a stem 62 side. The plurality of lead pins 35 penetrate through the stem 62. The support member 7 penetrates through the bottom wall portion 22*b* of the valve 22. The target 4 is fixed to a tip portion 71 of the support member 7 in a state where the target 4 is inclined on the tube axis A to face both the electron gun 3 and the window member 5.

In the X-ray generation device 10 including the sealed reflection type X-ray tube 1 configured as described above, as one example, in a state where the head 21 and the side tube 61 are set to the ground potential, a positive voltage is applied to the target 4 via the support member 7 by the power supply part 11, and a negative voltage is applied to each part of the electron gun 3 via the plurality of lead pins 35 by the power supply part 11. The electron beam B emitted from the electron gun 3 is focused onto the target 4 along a direction perpendicular to the tube axis A. The X-ray R generated in an irradiation region of the electron beam B on the target 4 transmits through the window member 5 and is emitted to the outside with the irradiation region as the focal point. In this case, the deflection part 12 that is an electromagnetic coil is disposed to surround the side tube 61.

In the X-ray generation device 10 including the sealed reflection type X-ray tube 1 as well, the electron beam adjustment part 14 adjusts the electron beam B such that the first defect 4*a* existing in the target 4 is not included in the irradiation region B1 of the electron beam B on the target 4 and/or such that the second defect 5*a* existing in the window member 5 is not included in the projection region B2 of the electron beam B on the window member 5. As shown in FIG. 5, in the case of assuming that the electron beam B incident on the target 4 is reflected by the target 4, when the window member 5 is disposed at a position where the electron beam B reflected by the target 4 is incident, the projection region B2 of the electron beam B on the window member 5 means an irradiation region of the electron beam B assumed to be reflected by the target 4 and be incident on the window member 5.

The X-ray tube 1 may be configured as an open transmission type X-ray tube or an open reflection type X-ray tube. The open transmission type or open reflection type X-ray tube 1 is configured such that the housing 2 is openable, and is an X-ray tube that allows components (for example, the window member 5 and each part of the electron gun 3) to be replaced. In the X-ray generation device 10 including the open transmission type or open reflection type X-ray tube 1, the degree of vacuum in the inner space of the housing 2 is increased by a vacuum pump.

In the sealed transmission type or open transmission type X-ray tube 1, the target 4 may be formed in at least a region of the second surface 52 of the window member 5, the region being exposed to the opening 23. In the sealed transmission type or open transmission type X-ray tube 1, the target 4 may be formed on the second surface 52 of the window member 5 with another film interposed therebetween.

The electron beam adjustment part 14 is not limited to including the deflection part 12 that is an electromagnetic coil and the control part 13 as long as the electron beam adjustment part 14 can adjust the electron beam B. For example, the deflection part 12 may be a permanent magnet disposed outside the housing 2 of the X-ray tube 1. Accordingly, the trajectory of the electron beam B can be adjusted with a simple configuration. The deflection part 12 may be an electrostatic lens disposed inside the housing 2 of the X-ray tube 1. The electron beam adjustment part 14 may include a focusing part (the first grid electrode 33 and/or the second grid electrode 34 of the electron gun 3 described above) that adjusts the irradiation region of the electron beam B on the target 4. Accordingly, the irradiation region (for example, spot diameter, irradiation position, and the like) of the electron beam B on the target 4 can be adjusted such that the first defect 4*a* existing in the target 4 is not irradiated with the electron beam B and/or such that the second defect 5*a* existing in the window member 5 is not irradiated with the X-ray R. Incidentally, at least two or more arbitrarily selected from the electromagnetic coil, the permanent magnet, the electrostatic lens, and the focusing part (the first grid electrode 33 and/or the second grid electrode 34) may be used together as the electron beam adjustment part 14.

When the window member 5 is formed in a plate shape from a single crystal diamond, and a polycrystalline portion is formed in a part of the window member 5, the polycrystalline portion of the window member 5 may be regarded as the second defect 5*a*, and the electron beam adjustment part 14 may adjust the electron beam B such that the polycrystalline portion is not irradiated with the X-ray R.

REFERENCE SIGNS LIST

1: X-ray tube, 2: housing, 3: electron gun, 4: target, 4*a*: first defect, 5: window member, 5*a*: second defect, 10: X-ray generation device, 12: deflection part, 13: control part, 14: electron beam adjustment part, 23: opening, 34: second grid electrode (focusing part), 52: second surface (surface), B: electron beam, R: X-ray.

The invention claimed is:

1. An X-ray generation device comprising:

an X-ray tube; and an electron beam adjustment part, wherein the X-ray tube includes a housing, an electron gun that emits an electron beam inside the housing, a target that generates an X-ray upon an incidence of the electron beam inside the housing, and a window member that seals an opening of the housing and that transmits the X-ray, a window member defect exists in the window member, and the electron beam adjustment part adjusts the electron beam such that the window member defect is not included in a projection region of the electron beam on the window member.

2. The X-ray generation device according to claim 1, wherein the electron beam adjustment part includes a deflection part that adjusts a trajectory of the electron beam.

3. The X-ray generation device according to claim 2, wherein the deflection part is an electromagnetic coil.

4. The X-ray generation device according to claim 2, wherein the deflection part is a permanent magnet.

5. The X-ray generation device according to claim 1, wherein the electron beam adjustment part adjusts an irradiation region of the electron beam on the target.

6. The X-ray generation device according to claim 1, wherein the window member is formed in a plate shape from a single crystal diamond, polycrystalline diamond, or mosaic crystal diamond.

7. The X-ray generation device according to claim 6, wherein the window member has a surface on an interior side of the housing, and the target is formed on the surface.

8. The X-ray generation device according to claim 1, wherein the target has a target defect, and the electron beam adjustment part adjusts the electron beam such that the target defect is not included in an irradiation region of the electron beam on the target.

* * * * *